3,826,847
PROCESS FOR PREPARATION OF FLAVOR DURABLE CHEWING GUM

Koichi Ogawa and Masatoshi Terasawa, Tokyo, Japan, assignors to Lotte Co., Ltd., Tokyo, Japan
No Drawing. Filed June 25, 1971, Ser. No. 157,002
Claims priority, application Japan, Oct. 21, 1970, 45/92,147
Int. Cl. A23g 3/30
U.S. Cl. 426—3  6 Claims

ABSTRACT OF THE DISCLOSURE

A chewing gum product having a durable flavor and containing seasonings including spices which have been coated, encapsulated or combined with high molecular weight compounds such as polyvinyl esters.

BACKGROUND OF THE INVENTION

The present invention relates to a novel chewing gum product having a flavor of improved durability and to a process for preparation of the same.

Chewing gum is typically manufactured by a process which comprises adding a plasticizer to a chewing gum base such as polyvinyl acetate, ester gum, chicle gum and the like or a mixture thereof to soften the chewing gum base, adding thereto with blending, calcium carbonate, talc, wax, polyisobutylene and the like to modulate the hardness, the viscoelasticity and the film formability thereof and adding to the thus made blend various seasonings including spices and coloring matter when desired, by means of a mechanical mixing operation so as to impart a unique flavor and appearance to the final chewing gum product.

When chewing of conventionally prepared chewing gum is commenced, the seasonings including sugar and other spices which have been mechanically mixed into the chewing gum are rapidly released therefrom into the mouth due to the chewing pressure and body temperature and are permeated into the saliva with an accompanying reduction of flavor durability.

To improve the durability of the flavor of chewing gum, it has been proposed to add an adsorbent when the seasonings are mixed into the chewing gum base. However, in order to enhance the durability of the flavor, a considerable amount of the adsorbent is required. Such an amount of the adsorbent impairs the chewing property of the gum and the appearance of the chewing gum product.

SUMMARY OF THE INVENTION

It is, therefore, a general object of the present invention to provide a new chewing gum product having a flavor of improved durability.

In accordance with the present invention, such new chewing gum product contains in its composition seasonings combined, encapsulated or coated with high molecular weight compounds.

In one aspect of the present invention, the seasonings including spices are homogeneously dispersed, with agitation in a solution of natural or synthetic water soluble high molecular weight compounds dissolved in a solvent therefor and thereafter subjected to pulverization so as to obtain integrated granules or alternatively to a coating treatment with natural or synthetic water soluble or water insoluble high molecular weight compounds to obtain coated or encapsulated seasonings which are subsequently added to the chewing gum base together with known chewing gum additives.

It will be appreciated that the above process may be carried out separately or in combination with one or more other processes. That is, the chewing gum product may preferably contain seasonings in ordinary form, in integrally pulverized form, in coated form as well as in encapsulated form so that the seasonings upon chewing the gum may be dissolved out stepwisely in the order of the seasoning in the ordinary form, the integrally pulverized seasoning, the coated seasoning and the encapsulated seasoning with the extended flavor durability.

DESCRIPTION OF THE PREFERRED EMBODIMENTS

The term seasonings as herein used means flavor ingredients for chewing gum including sweeteners, salts, acidifying agents and other spices.

A few examples of useful sweeteners are monosaccharides such as granular dextrose and the like, disaccharides such as powdered cane sugar and the like, polysaccharides such as powdered wheat gluten and the like and other synthetic seasonings such as saccharin, dulcin and the like.

Useful examples of salt are the commercially available soy powder, Japanese miso powder, sauce powder, and other salt powders prepared from various sources.

The acidifying agents preferably used in the present invention are powders of organic acids such as quenic acid, tartaric acid, malic acid, acetic acid and the like.

Useful examples of spices are oil mints such as peppermint, spearmint and the like, essential oils extracted from oranges, lemons and other fruits, bean-derived flavors such as coffee, cocoa and the like, wine flavors such as curacao zin and the like and pungent materials such as affinin, pepper, mustard and the like.

Of the above pungent spices, an affinin or N-isobutyl-2,6,8-decatrieneamide may be more beneficially used to impart some refreshing pungent stimulation to the tongue. This affinin may be preferably mixed into the chewing gum product in the form of oleoresin, coated granules or encapsulated spice.

The water soluble natural high molecular weight compounds preferably used include starches, cellulose, proteins and gums, while polyvinyl alcohol may be used as the water soluble synthetic high molecular weight compound. Further, polyvinyl acetate, low molecular weight polyethylene and the like may be used as the water insoluble high molecular weight compound.

Another class of synthetic high molecular weight compounds beneficially used in the present invention comprises polyvinyl esters and more particularly polyvinyl acetate, polyvinyl propionate, a graft-copolymer of polyvinyl propionate with vinyl acetate, and a copolymer essentially of vinyl acetate with a small amount of ethylene, propylene, acrylic acid, methacrylic acid, crotonic acid, maleic acid or an ester of such an unsaturated acid each having a polymerization degree of 200–1500 and all of which may be used either alone or in the form of their mixtures.

In accordance with the present invention, the polyvinyl ester may be combined with the seasoning by dissolving the polyvinyl ester in a solvent such as ethanol, ethyl acetate and the like to obtain a 2–30% by weight solution to which there is subsequently added with agitation the seasoning in an amount at least 1–20 times the polyvinyl ester content to form a homogeneous dispersion, and then a liquid miscible with said solution but immiscible with the polyvinyl ester such as ether, hexane or the like is slowly added to the dispersion so that polyvinyl ester granules integrated with the seasoning are separated out in the form of non-adhesive particles convenient for incorporation into the chewing gum base. However, a durable flavor may also be obtained by merely mechanically blending the polyvinyl ester with the seasoning for pulverization.

The particle size of the high molecular weight compounds integrated with the seasonings may be preferably selected from less than 20 mesh and notably less than 48 mesh. It will be appreciated that the particle size and the thickness and hardness of the coating layer of the granular products may be selectively varied to modulate the flavoring effect of the chewing gum.

The coating or encapsulation of the seasoning is carried out by means of known spray dryer or spray gun techniques.

In a typical embodiment for manufacturing the flavor durable chewing gum according to the present invention, a known chewing gum base resin such as polyvinyl acetate, polyvinyl propionate, ethyl cellulose, chicle, jelutong or ester gum alone or in the form of a mixture is blended with a plasticizer such as dibutylphthalate, butylphthalyl butyl glycolate, methylacetylcyanate or the like together with other additives such as calcium carbonate, talc, wax, polyisobutylene and/or polybutylene under heat to plasticize the blend as well as to modulate the hardness, the viscoelasticity and the film formability of the chewing gum base. The prepared chewing gum base is in turn blended with seasonings integrated or coated with or encapsulated by the high molecular weight compounds as prepared in accordance with the present invention and is finally blended with known chewing gum additives including sweeteners, salts, acidifying agents and other spices as well as coloring matters to obtain a chewing gum product having improved flavor durability.

The present invention will be readily understood from a consideration of the following specific examples which are given for the purpose of illustration only and are not intended to limit the scope of the invention in any way.

Example 1

1000 parts of granulated sugar having a particle size of less than 48 mesh was added with agitation to 1000 parts of a 20% ethyl acetate solution of polyvinyl acetate having a polymerization degree of 400 for homogeneous dispersion. Subsequently, a mixed liquid of 60% hexane with 40% ethyl acetate was slowly dropped into the resulting solution and after the addition of 1700 parts of the mixed liquid granules separated out. Hexane is further added to the liquid mixture and the supernatant obtained by repeated decantations was subjected to suction filtration to dryness so as to produce a granular product. The yield was 1150 parts containing 1100 parts having a particle size of less than 48 mesh. Thereafter, 80 parts of polyvinyl acetate having a polymerization degree of 400 with 40 parts of ester gum, 3 parts of dibutylphthalate as a plasticizer and 15 parts of chicle were thrown into a kneader for subsequent blending under heat and then 50 parts of the above granular product with 10 parts of calcium carbonate as a hardness modulator were added without heat for further blending to obtain the chewing gum base. The prepared chewing gum base was added to and blended with 600 parts of granulated sugar, 190 parts of crystallized dextrose and 2 parts of spices for blending and the blends were placed in the atmosphere for cooling and then rolled into a sheet of chewing gum. The chewing gum product thus prepared still holds the sweet flavor for 10 minutes or more after commencement of chewing.

Example 2

80 parts of polyvinyl acetate having a polymerization degree of 400, 40 parts of ester gum, 3 parts of dibutylphthalate and 15 parts of chicle are thrown into a kneader for blending with heat and then 10 parts of calcium carbonate was added thereto for further blending to obtain a chewing gum base. The resulting chewing gum base was added with blending to 600 parts of granulated sugar, 190 parts of crystallized dextrose, 2 parts of spices together with 10 parts of the granular product as prepared in Example 1 and the resulting blend was placed in the atmosphere for cooling and then rolled into a sheet of chewing gum. The chewing gum thus prepared showed an improved sweet flavor durability like the chewing gum prepared in Example 1 while conventional chewing gum free from the above granulated seasoning could not hold the sweet flavor for more than five minutes after the commencement of the chewing operation.

Example 3

1000 parts of tartaric acid having a particle size of less than 48 mesh was added with agitation into a 6% ethyl acetate solution of polyvinyl acetate having a polymerization degree of 1100 for homogeneous mixture and the same subsequent procedures as those described in Example 1 were carried out to obtain a granular product.

80 parts of polyvinyl acetate having a polymerization degree of 1100, 3 parts of dibutylphthalate and 15 parts of chicle were blended in a kneader with heat and the resulting blend was added with cooling to 3 parts of the above prepared granular product and 5 parts of talc to obtain a chewing gum base. The resulting chewing gum base was further added with blending to 450 parts of granulated sugar, 140 parts of crystallized sugar and 2 parts of spice and the resulting blend was cooled and rolled into a sheet of chewing gum. The chewing gum prepared in accordance with this Example still held the acidic flavor for 10 minutes or more after the commencement of chewing while chewing gum blended with the tartaric acid in the conventional manner could not hold the acidic flavor for more than three minutes after the commencement of chewing.

Example 4

Salted tangle powder was subjected to conventional encapsulation and 20% of the resulting capsules was added with blending to 20% of a chewing gum base together with 59% of sweeteners and 1% of species to obtain a final chewing gum product. The prepared chewing gum held the salted and sweetened tangle flavor for more than ten minutes.

Example 5

Affinin in the form of oleoresin was added with agitation to a paste solution and the resulting emulsion was subjected to conventional spray drying to obtain coated pungent spices. 5% of the resulting product was added with blending to 35% of a chewing gum base together with 59% of sweeteners and 1% of spice to obtain the final product.

Example 6

| | Percent |
|---|---|
| Chewing gum base | 25 |
| Chewing gum additives | 74 |
| Mint oil | 0.2 |
| Granulated mint oil | 0.2 |
| Double coated mint oil | 0.2 |
| Encapsulated mint oil | 0.4 |

The chewing gum product prepared in accordance with the above blending proportions held the mint flavor for more than 15 minutes with substantially constant flavor moderation.

In accordance with the present invention, the seasonings the conventional form are released into the mouth at the beginning of the chewing action and the seasoning combined, encapsulated or coated with the high molecular weight compounds is crushed by the teeth in proportion to the decrease of the volume of the chewing gum due to the release of the chewing gum additives and the sweeteners whereby the durability of the flavor is advantageously improved. Modification is possible in the selection of the particular materials employed and in the amounts thereof as well as in the particular techniques.

What is claimed is:

1. A process for preparing a flavor durable chewing gum comprising dissolving approximately by weight 2–30% of a polyvinyl ester in a first solvent selected from the group consisting of ethanol, ethyl acetate and mixtures thereof, homogeneously dispersing a seasoning agent in an amount, by weight, at least 1–20 times the polyvinyl ester content in the resultant solution, adding to said solution a second solvent which is miscible with said first solvent but is a non-solvent for said polyvinyl ester, said second solvent being selected from the group consisting of ether, hexane and mixtures thereof, whereby said polyvinyl ester is precipitated out in the form of small particles which, in said precipitation, become integrated with the seasoning agent particles, isolating the combined particles of the polyvinyl ester and the seasoning agent thus formed, and uniformly distributing said combined particles in a chewing gum base whereby a chewing gum article subsequently produced therefrom will have a prolonged duration of flavor retention.

2. A process for preparing a flavor durable chewing gum comprising dissolving approximately by weight 2–30% of a polyvinyl ester in a solvent selected from the group consisting of ethanol, ethyl acetate, and mixtures thereof, homogeneously dispersing a seasoning agent in an amount, by weight, at least 1–20 times the polyvinyl ester content in the resultant solution, mixing said dispersion to form an emulsion of said seasoning agent in said solution, precipitating said polyvinyl ester whereby the precipitated polyvinyl ester encapsulates the seasoning agent particles to produce particles of encapsulated seasoning agent, isolating the encapsulated seasoning agent particles, and uniformly distributing said encapsulated particles in a chewing gum base whereby a chewing gum article subsequently produced therefrom will have a prolonged duration of flavor retention.

3. A process for preparing a flavor durable chewing gum comprising dissolving approximately by weight 2–30% of a polyvinyl ester in a solvent selected from the group consisting of ethanol, ethyl acetate, and mixtures thereof, adding to said solution an amount, by weight, of a seasoning agent, insoluble in said solution, at least 1–20 times the polyvinyl ester content, mixing with agitation the resultant dispersion to form a uniform mixture of said seasoning agent and said solution of polyvinyl ester and to effect coating of said seasoning agent particles with said solution, drying the resultant mixture to form particles of polyvinyl ester coated seasoning agent, and uniformly distributing said coated particles in a chewing gum base whereby a chewing gum article subsequently produced therefrom will have a prolonged duration of flavor retention.

4. A process for preparing a flavor durable chewing gum comprising uniformly distributing in a chewing gum base one or more seasoning agents selected from the group consisting of:
  (a) combined particles of a polyvinyl ester and a seasoning agent prepared by dissolving approximately by weight 2–30% of a polyvinyl ester in a first solvent selected from the group consisting of ethanol, ethyl acetate, and mixtures thereof, homogeneously dispersing a seasoning agent in an amount, by weight, at least 1–20 times the polyvinyl ester content in the resultant solution, adding to said solution a second solvent which is miscible with said first solvent but is a non-solvent for said polyvinyl ester, said second solvent being selected from the group consisting of ether, hexane and mixtures thereof, whereby said polyvinyl ester is precipitated out in the form of small particles which, in said precipitation, become integrated with the seasoning agent particles, and isolating the combined particles of the polyvinyl ester and the seasoning agent thus formed;
  (b) polyvinyl ester encapsulated seasoning agent particles prepared by dissolving approximately by weight 2–30% of a polyvinyl ester in a solvent selected from the group consisting of ethanol, ethyl acetate, and mixtures thereof, homogeneously dispersing a seasoning agent in an amount, by weight, at least 1–20 times the polyvinyl ester content in the resultant solution, mixing said dispersion to form an emulsion of said seasoning agent in said solution, precipitating said polyvinyl ester whereby the precipitated polyvinyl ester encapsulates the seasoning agent particles to produce particles of encapsulated seasoning agent, and isolating the encapsulated seasoning agent particles; and
  (c) polyvinyl ester coated seasoning agent particles prepared by dissolving approximately by weight 2–30% of a polyvinyl ester in a solvent selected from the group consisting of ethanol, ethyl acetate, and mixtures thereof, adding to said solution a seasoning agent in an amount, by weight, at least 1–20 times the polyvinyl ester content, said seasoning agent being insoluble in said solution, mixing with agitation the resultant dispersion to form a uniform mixture of said seasoning agent and said solution of polyvinyl ester and to effect coating of said seasoning agent particles with said solution, and drying the resultant mixture to form particles of polyvinyl ester coated seasoning agent, whereby a chewing gum article subsequently produced from said chewing gum base will have a prolonged duration of flavor retention.

5. A process as defined in claim 4, wherein the particle size of said group members (a), (b) and (c) is less than 20 mesh.

6. A process as defined in claim 5, wherein said particle size is less than 48 mesh.

References Cited

UNITED STATES PATENTS

| | | | |
|---|---|---|---|
| 2,886,446 | 5/1959 | Kramer et al. | 99—135 |
| 3,440,060 | 4/1969 | Rife et al. | 99—135 |
| 2,596,852 | 5/1952 | Heggie | 99—135 |
| 3,069,370 | 12/1962 | Jensen et al. | 99—135 X |
| 3,085,048 | 4/1963 | Bush | 99—135 X |

A. LOUIS MONACELL, Primary Examiner

J. M. HUNTER, Assistant Examiner